US008700548B2

(12) United States Patent  
Bhandari et al.

(10) Patent No.: US 8,700,548 B2  
(45) Date of Patent: Apr. 15, 2014

(54) OPTIMIZATION TECHNIQUE USING EVOLUTIONARY ALGORITHMS

(75) Inventors: Dinabandhu Bhandari, Kolkata (IN); C. A. Murthy, Kolkata (IN); Sankar Kumar Pal, Kolkata (IN)

(73) Assignee: Indian Statistical Institute, Kolkata, West Bengal (IN)

( * ) Notice: Subject to any disclaimer, the term of this patent is extended or adjusted under 35 U.S.C. 154(b) by 235 days.

(21) Appl. No.: 13/265,480

(22) PCT Filed: Oct. 15, 2010

(86) PCT No.: PCT/IB2010/054679
§ 371 (c)(1),
(2), (4) Date: Oct. 20, 2011

(87) PCT Pub. No.: WO2011/135410
PCT Pub. Date: Nov. 3, 2011

(65) Prior Publication Data
US 2012/0123980 A1    May 17, 2012

(30) Foreign Application Priority Data

Apr. 28, 2010   (IN) .............................. 472/KOL/2010

(51) Int. Cl.
*G06F 15/18*       (2006.01)
*G06N 3/00*        (2006.01)
*G06N 3/12*        (2006.01)

(52) U.S. Cl.
USPC ........................................................ 706/13

(58) Field of Classification Search
None
See application file for complete search history.

(56) References Cited

U.S. PATENT DOCUMENTS

| 5,222,192 A * | 6/1993 | Shaefer ........................... 706/13 |
| 5,255,345 A | 10/1993 | Shaefer |
| 2002/0168010 A1 | 11/2002 | Ali |
| 2008/0183648 A1 | 7/2008 | Goldberg et al. |
| 2009/0307636 A1 * | 12/2009 | Cases et al. ...................... 716/2 |

FOREIGN PATENT DOCUMENTS

WO     2008122412 A1    10/2008

OTHER PUBLICATIONS

Journal of the Chinese Institute of Industrial Engineers, vol. 21, No. 5, pp. 516-526 (2004) Solving Line-Feature Stereo Matching With Genetic Algorithms in Hough Space.*
International Search Report and Written Opinion dated Jan. 11, 2011 for International Application No. PCT/IB2010/054679.

(Continued)

*Primary Examiner* — Kakali Chaki
*Assistant Examiner* — Ababacar Seck
(74) *Attorney, Agent, or Firm* — Brundidge & Stanger, P.C.

(57) ABSTRACT

Provided embodiments include a method, a system, a device, and an article of manufacture. A system for terminating a genetic algorithm (GA), where the GA uses an iterator and generates one best solution per iteration, includes a memory, an iterative processor, and a terminating processor. The memory is provided for storing a plurality of best solutions generated in a plurality of iterations of the GA. One of the best solutions generated in one of the iterations is stored in the memory if the one of the best solutions is better than a previous one of the best solutions generated in a previous one of the iterations. The iterative processor computes a variance of the plurality of the best solutions stored in the memory. The terminating processor terminates the iterator when the variance is less than or equal to a predetermined threshold.

16 Claims, 11 Drawing Sheets

| Function | $\epsilon$ | Average number of Iterations | % of cases when global solution is reached | Number of strings in search space | Number of strings searched |
|---|---|---|---|---|---|
| $f_1$ | $10^{-2}$ | 208.01 | 29 | | 2,080 |
| | $10^{-3}$ | 541.04 | 43 | $2^{20} \approx 10^6$ | 5,410 |
| | $10^{-4}$ | 4421.97 | 62 | | 44,219 |
| | $10^{-5}$ | 28207.21 | 78 | | 282,072 |
| $f_2$ | $10^{-2}$ | 938.36 | 12 | | 46,918 |
| | $10^{-3}$ | 16625.88 | 23 | $2^{100} \approx 10^{30}$ | 831,294 |
| | $10^{-4}$ | 203736.02 | 37 | | 10,186,801 |
| | $10^{-5}$ | 1260294.83 | 53 | | 63,014,741 |
| $f_3$ | $10^{-2}$ | 821.04 | 89 | | 41,052 |
| | $10^{-3}$ | 5298.25 | 100 | $2^{100} \approx 10^{30}$ | 264,912 |
| | $10^{-4}$ | 36175 | 100 | | 1,808,750 |
| | $10^{-5}$ | 99980.98 | 100 | | 4,999,049 |
| $f_4$ | $10^{-2}$ | 235.78 | 0 | | 11,789 |
| | $10^{-3}$ | 1289.42 | 0 | $2^{100} \approx 10^{30}$ | 64,471 |
| | $10^{-4}$ | 14392.51 | 0 | | 719,625 |
| | $10^{-5}$ | 92406.10 | 20 | | 4,620,305 |

(56) References Cited

OTHER PUBLICATIONS

Pendharkar, P.C. and Koehler, G.J., "A general steady state distribution based stopping criteria for finite length genetic algorithms," European Journal of Operational Research, vol. 176, Issue 03, Feb. 2007, pp. 1436-1451.

Safe, M. et al., "On Stopping Criteria for Genetic Algorithms," Advances in Artificial Intelligence —SBIA 2004, vol. 3171, 2004, pp. 405-413.

Aytug, H. and Koehler, G. J., "New Stopping Criterion for Genetic Algorithms," European Journal of Operational Research, vol. 126, Issue 3, 2000, pp. 662-674.

Bhandari, D., et al., "Genetic Algorithms with Elitist Model and its Convergence," International Journal of Pattern recognition and Artificial Intelligence, vol. 10, Issue 06, 1996, pp. 731-747.

Davis, T. E. and Principe, C. J., "A simulated Annealing like Convergence Theory for the Simple Genetic Algorithm," in Proceedings of 4th Int. Conf. on genetic algorithms, 1991, pp. 174-181.

Dejong, K. A., "An analysis of the behaviour of a class of genetic adaptive systems," PhD thesis, Technical Report No. 185, Department of Computer and Communication Science, Univ. of Michigan, 1975, pp. 271.

Jain, B. J. et al., "On Termination Criteria of Evolutionary Algorithms," In GECCO 2001—Proceedings of the Genetic and Evolutionary Computation Conference., pp. 331-338, San Francisco, CA. Morgan Kauffmann.

Maity, S. P. and Kundu, M. K., "Genetic algorithms for optimality of data hiding in digital images," Soft Computing, vol. 13, Issue 4, Oct. 2008, pp. 361-373.

Munteanu, C. and Rosa, A., "Gray-scale image enhancement as an automatic process driven by evolution," IEEE Transactions on Systems, Man and Cybernetics-Part B: Cybernetics, vol. 34, Issue 2, Apr. 2004, pp. 1292-1298.

Murthy, C. A., et al., "Optimal Stopping Time for Genetic Algorithms," Fundamenta Informaticae, vol. 35, Issue 1-4, 1998, pp. 91-111.

Nix, A. E. and Vose, M.D. "Modeling genetic algorithms with Markov Chains," Annals of Mathematics and Artificial Intelligence, vol. 5, Issue 1, 1992, pp. 79-88.

Pal, S. K. and Bhandari, D., "Selection of optimal set of weights in a layered network using genetic algorithms," Information Sciences, vol. 80, Issues 3-4, Sep. 1994, pp. 213-234.

Pal, S. K. et al. "Genetic algorithms for optimal image enhancement," Pattern Recognition Letters, vol. 15, Mar. 1994, pp. 261-271.

Rudolph, G., "Convergence analysis of canonical genetic algorithm," IEEE Transactions on Neural networks, vol. 5, Issue 1, Jan. 1994, pp. 96-101.

Suzuki, J., "A markov chain analysis on simple genetic algorithm," IEEE Transactions on Systems, Man and Cybernetics, vol. 25, Issue 4, Apr. 1995, pp. 655-659.

Vose, M.D. "Modeling simple genetic algorithms," Journal Evolutionary Computation, vol. 3, Issue 4,1995, pp. 453-472.

D. Bhandari et al., "An Optimal Stopping Criterion for complex optimization," Evolutionary Computation, Massachusetts Institute of Technology, pp. 1-15.

\* cited by examiner

| Function | $\epsilon$ | Average number of iterations | % of cases when global solution is reached | Number of strings in search space | Number of strings searched |
|---|---|---|---|---|---|
| $f_1$ | $10^{-2}$ | 365.01 | 29 | $2^{20} \approx 10^6$ | 2,080 |
| | $10^{-3}$ | 841.04 | 43 | | 5,410 |
| | $10^{-4}$ | 4421.97 | 62 | | 44,219 |
| | $10^{-5}$ | 28207.21 | 78 | | 282,072 |
| $f_2$ | $10^{-2}$ | 938.38 | 12 | $2^{100} \approx 10^{30}$ | 46,918 |
| | $10^{-3}$ | 16625.88 | 23 | | 831,294 |
| | $10^{-4}$ | 203736.02 | 37 | | 10,186,801 |
| | $10^{-5}$ | 1260294.83 | 53 | | 63,014,741 |
| $f_3$ | $10^{-2}$ | 821.04 | 89 | $2^{100} \approx 10^{30}$ | 41,052 |
| | $10^{-3}$ | 5298.25 | 100 | | 264,912 |
| | $10^{-4}$ | 36175 | 100 | | 1,808,780 |
| | $10^{-5}$ | 99980.98 | 100 | | 4,999,049 |
| $f_4$ | $10^{-2}$ | 235.78 | 0 | $2^{100} \approx 10^{30}$ | 11,789 |
| | $10^{-3}$ | 12889.42 | 0 | | 644,471 |
| | $10^{-4}$ | 14392.51 | 0 | | 719,625 |
| | $10^{-5}$ | 92406.10 | 20 | | 4,620,305 |

FIG. 7

OPTIMIZATION TECHNIQUE USING EVOLUTIONARY ALGORITHMS

CROSS-REFERENCE TO RELATED APPLICATION

The present application is the U.S. national phase application of, and claims priority to, International application No. PCT/IB2010/054679, filed on Oct. 15, 2010, which claims priority to Indian Application Serial No. 472/KOL/2010, filed Apr. 28, 2010, the entirety of which is incorporated herein by reference.

BACKGROUND

An evolutionary algorithm (EA) is a subset of evolutionary computation, a generic population-based metaheuristic optimization algorithm. EAs use one or more operators inspired by biological evolution, which include reproduction, mutation, recombination, and selection. Candidate solutions to an optimization problem play the role of individuals in a population. A fitness function determines an environment within which the candidate solutions "live". Evolution of the population then takes place after repeated application of the operators.

Generally, an initial population of randomly generated candidate solutions forms a first generation. The fitness function is applied to the candidate solutions and any offspring. In selection, parents for the next generation are chosen with a bias towards higher fitness. The parents reproduce by copying with recombination and/or mutation. Recombination acts on the two selected parents (candidates) and results in one or two children (new candidates). Mutation acts on one candidate and results in a new candidate. These operators create the offspring (a set of new candidates). These new candidates compete with old candidates for their place in the next generation. This process may be repeated until a candidate with sufficient quality (a solution) is found or a predefined computational limit is reached.

EAs are of many different types and can be used to find solutions to problems in diverse fields. The fields may include engineering, robotics, physics, chemistry, biology, genetics, operations research, economics, sales, marketing, and so on.

A genetic algorithm (GA) is a type of EA. GAs provide solutions to complex optimization problems. GAs are stochastic search methods based on principles of natural genetic systems. In an example of a GA, an initial population is chosen, and fitness of each individual in the population is evaluated. Then the following steps are repeated until a stopping criterion is satisfied: Selecting best ranking individuals to reproduce; breeding a new generation through crossover and mutation (called genetic operations) and giving birth to offspring (strings); evaluating fitness of each individual offspring; and retaining best ranked offspring obtained so far. The stopping criterion determines when to stop (i.e., terminate) the GA.

GAs perform a multidimensional search in providing an optimal solution for an evaluation function (i.e., a fitness function) of an optimization problem. Unlike conventional search methods, GAs deal simultaneously with multiple solutions and use only fitness function values. Population members are represented by strings corresponding to chromosomes. Search begins with a population of randomly selected strings. From these strings, a next generation is created using genetic operators. At each iteration, individual strings are evaluated with respect to a performance criterion and are assigned a fitness value. Strings are selected based on these fitness values in order to produce the offspring for the next generation. Thus, successive populations of feasible solutions are generated in stochastic manner following laws of natural selection.

GAs have been theoretically and empirically found to provide global near-optimal solutions for complex optimization problems in various fields. For example, the fields include, but are not limited to, operations research, very large scale integration (VLSI) circuit design, pattern recognition, image processing, machine learning, and so on.

SUMMARY

An embodiment of the subject matter described herein provides a method for terminating a genetic algorithm (GA), where the GA uses an iterator and generates at least one best solution per iteration. The method includes storing a plurality of best solutions generated in a plurality of iterations of the GA. One of the best solutions generated in one of the iterations is stored in a memory if the one of the best solutions is better than a previous one of the best solutions generated in a previous one of the iterations. The method further includes computing a variance of the plurality of the best solutions stored in the memory using an iterative processor and terminating the iterator using a terminating processor when the variance is less than or equal to a predetermined threshold.

The method further includes computing the variance in each iteration following a predetermined one of the iterations. The method includes determining whether the variance is less than or equal to the predetermined threshold after a predetermined number of the iterations are completed following a predetermined one of the iterations. The method includes statistically determining the predetermined threshold based on a rate of change of the variance when the rate of change relative to a number of the iterations is negative. The method includes statistically determining the predetermined one of the iterations based on a rate of change of the variance relative when the rate of change to a number of the iterations is positive. The method includes statistically determining the predetermined number of the iterations based on a rate of change of the variance when the rate of change relative to a number of the iterations is negative.

The method includes generating the one best solution per iteration from a population of solutions using a fitness function, where each solution in the population is coded as a string of a finite length, and where the predetermined one of the iterations is statistically determined based on the finite length and a size of the population. The method includes generating a subsequent population of solutions from the population of solutions using operators, which include selection, crossover, and mutation when the variance is greater than the predetermined threshold.

The method includes selecting the predetermined threshold based on a desired accuracy of the GA. The predetermined threshold takes into account properties of an objective function and genetic parameters used in the GA.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 7 is an example table showing average number of iterations required to converge a GA for a given bound of variance;

DETAILED DESCRIPTION

Figure 1:
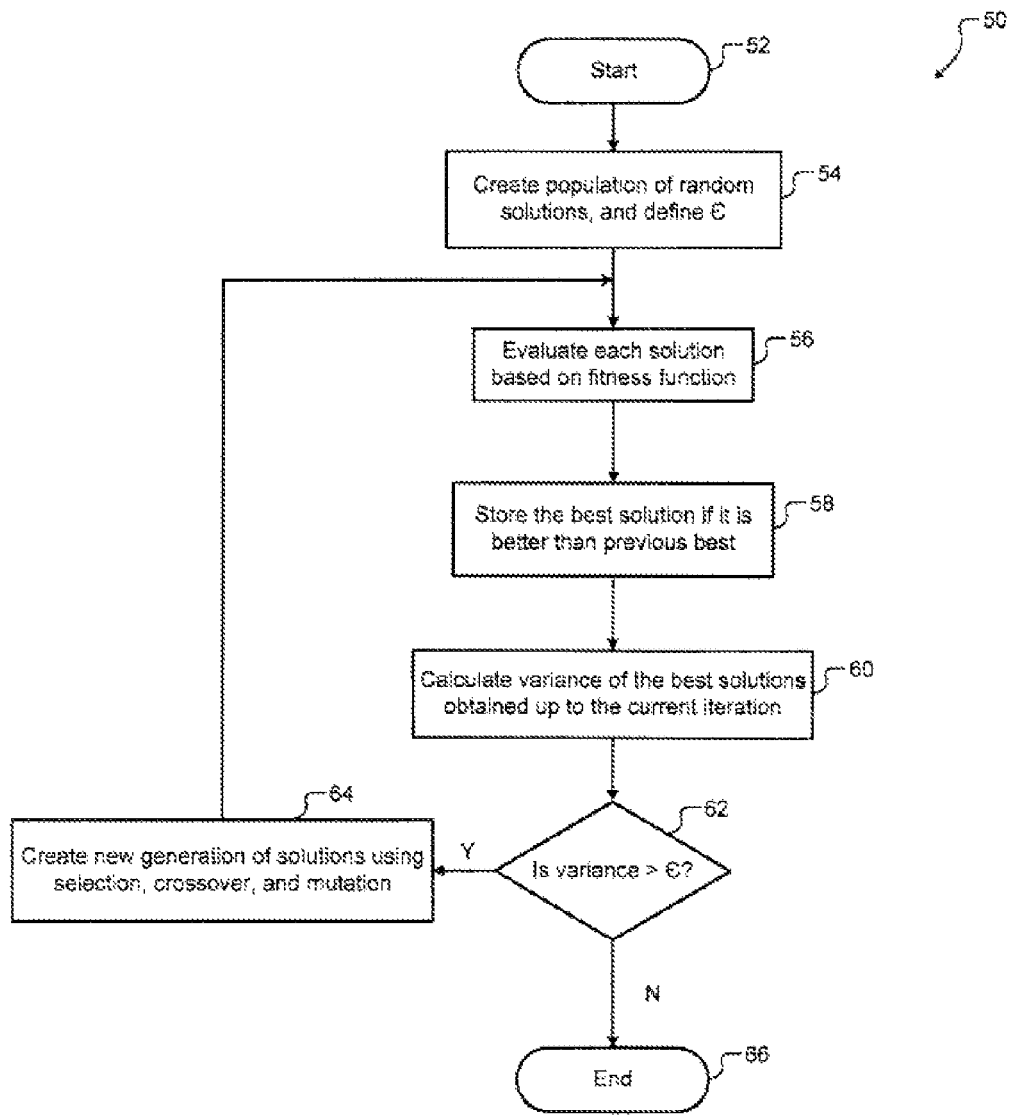
FIG. 1 is an example flowchart of a method for determining a stopping criterion and terminating a GA using the stopping criterion.
Figure 2:
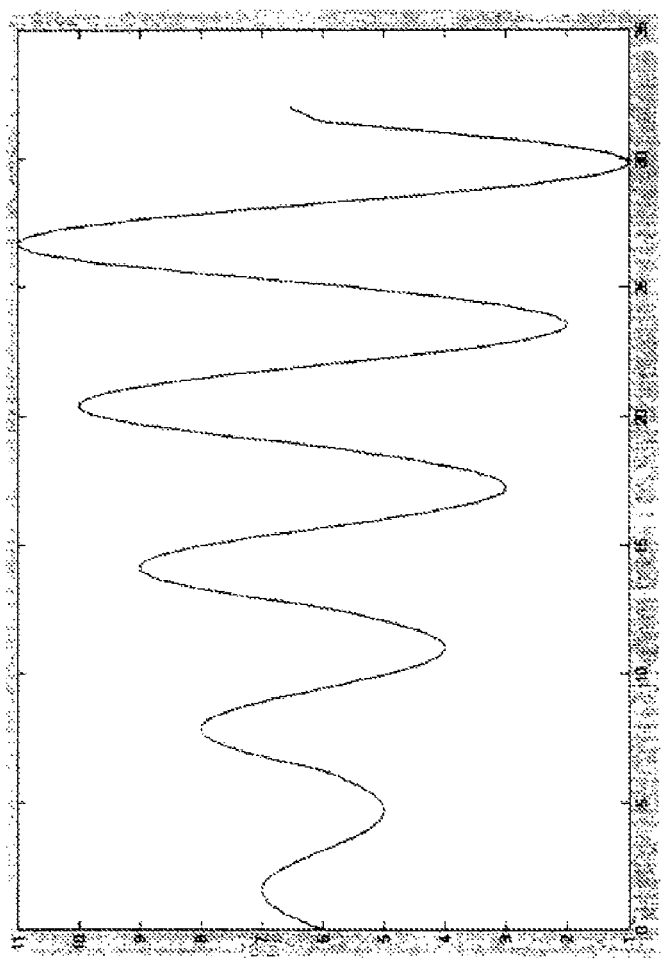
FIGS. 2-5 illustrate pictorial representations of four sample objective functions.
Figure 3:
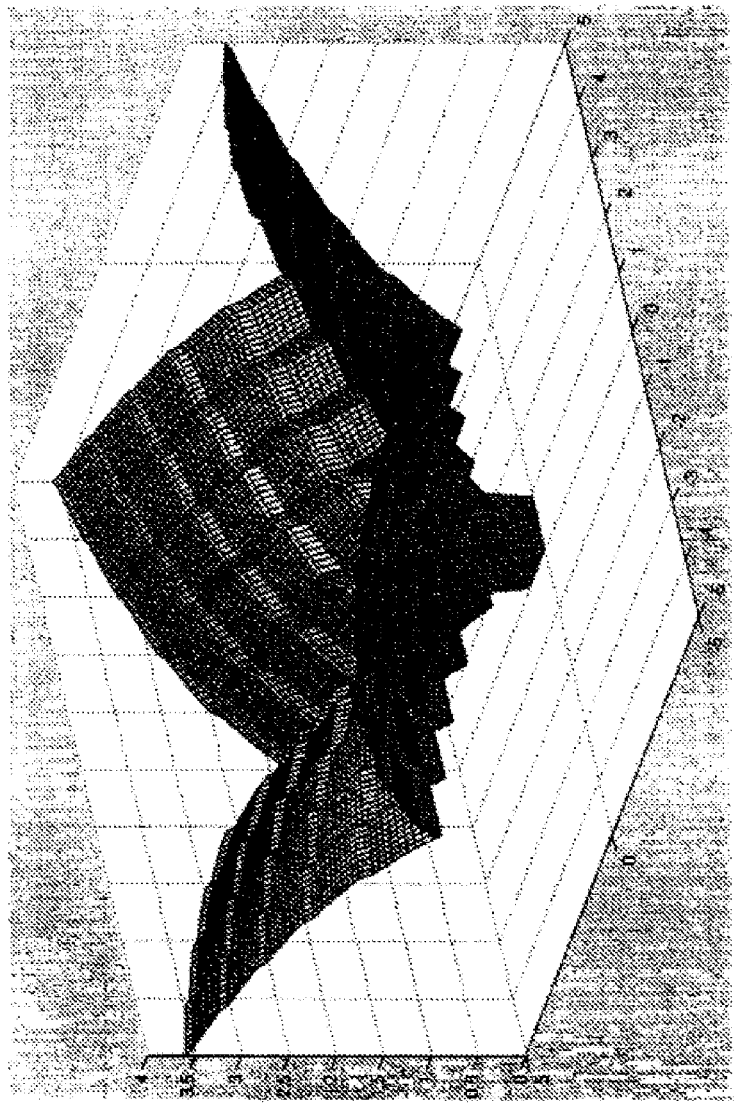
Figure 4:
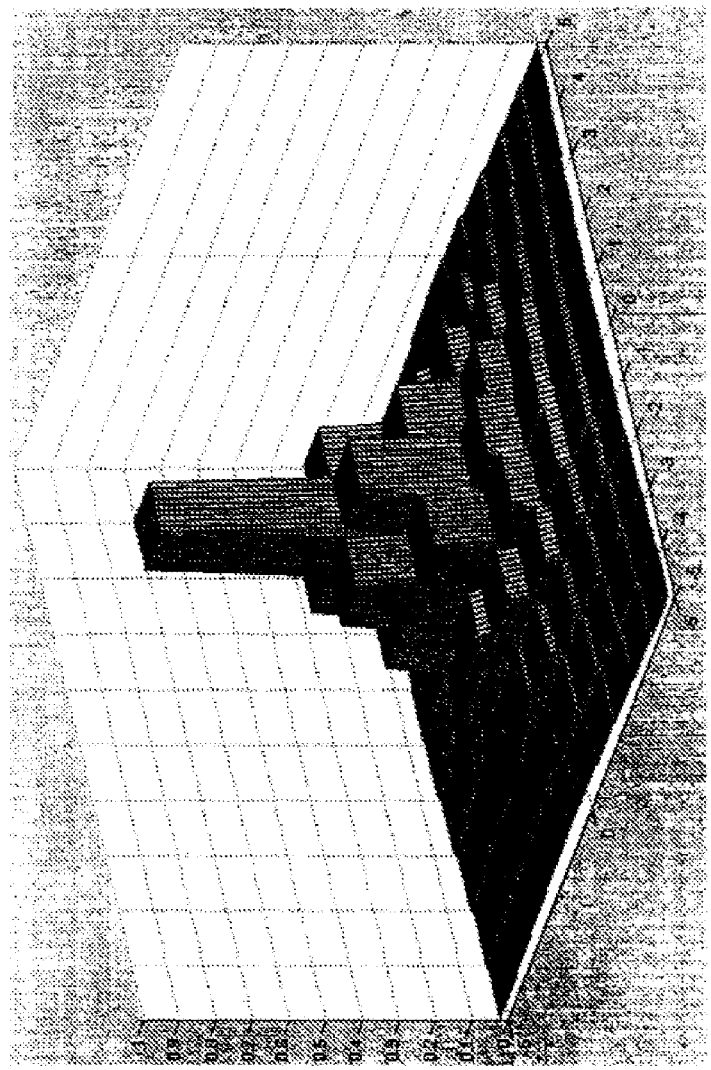
Figure 5:
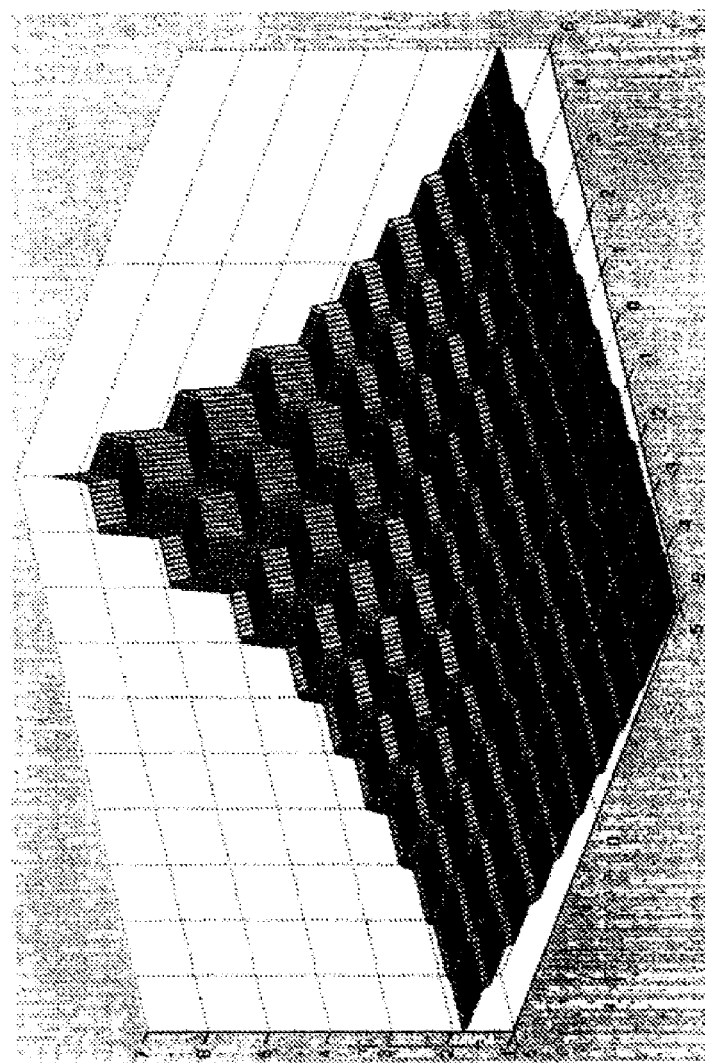

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

An example embodiment includes finding a solution to complex optimization problems using evolutionary algorithms (EAs) and employs a stopping criterion for the algorithm. In this example embodiment, a genetic algorithm (GA) is used as an example only. However, embodiments disclosed herein are not limited to GAs. The teachings of the present disclosure are applicable to any iterative optimization technique including the EA. Such techniques include genetic algorithms, simulated annealing, ant colony optimization, particle swarm optimization, among others. Specifically, the teachings of the present disclosure can be applied to solve problems in any field using any iterative optimization technique that obtains a best solution from a number of candidate solutions.

In GAs, for example, selection of a stopping criterion determines the quality of results generated by a GA. More than one stopping criterion may be used in a GA. Different types of stopping criteria can be used. These stopping criteria may be based on fitness function convergence, population convergence, generation number, and/or computation time. Further, these stopping criteria may be based on running mean of fitness values, standard deviation of fitness values, and/or search feedback. These statistical properties are those of the solutions obtained. Other stopping criteria based on objective function use underlying fitness function values to calculate auxiliary values, which are used as measures of state of convergence of a GA. Additionally, a cluster-based stopping criterion takes into account information about objective values as well as a spatial distribution of individuals in a search space in order to terminate a GA.

Generally, in defining an implementable stopping criterion, a bound may be provided on the number of iterations required to achieve a level of confidence to guarantee that a GA has searched all the optimal number of strings. Alternatively or additionally, pessimistic and optimistic stopping times with respect to mutation probability may be derived.

Defining an implementable stopping criterion in these ways, however, can be problematic. For example, deciding when to stop a GA without a priori information regarding objective function is difficult. Though time based stopping criteria are simple to implement, determining the time requires knowledge about the global optimal solution, which is not always available a priori. Further, these stopping criteria do not guarantee the convergence of the GAs to the global optimal solution since they are terminated after a finite number of iterations. Accordingly, regardless of the value selected for the number of iterations, there is generally a positive probability of not obtaining the global optimal solution at that stage.

An embodiment proposed herein relates to a new stopping criterion based on variance of best fitness values obtained over generations. In an example embodiment, variance of the best fitness values obtained in iterations is used as a measure to decide the termination criterion of a GA with elitist model (EGA). In an EGA, elitism reserves two slots in the next generation for the highest scoring candidate (e.g., chromosome) of the current generation without allowing that candidate to be crossed over in the next generation. In one of those slots, the elite candidate will also not be subjected to mutation in the next generation.

In an embodiment, the stopping criterion can be based only on the fitness function values. The stopping criterion can automatically take into account properties of the objective function and the genetic parameters used. Accordingly, in an example embodiment, a user need not study characteristics of the objective function and genetic parameters used in the GA. Further, no auxiliary values are calculated. Implementing the stopping criterion based on variance of the fitness function values obtained over generations includes selecting a small value of bound for the variance. The variance tends to zero when a number of generations tends to infinity while a probability of obtaining a global optimal solution tends to one.

To facilitate understanding of the example embodiments, definitions of basic concepts relating to the GAs are now introduced. To understand basic principles of GAs, consider a problem of maximizing a function $f(x)$, $x \in D$, where $D$ is a finite set. The problem is to find $x^*$ such that $$f(x^*) \geq f(x); \forall x \in D,$$

where $D$ is a discrete domain and is finite.

When solving an optimization problem using GAs, each solution is coded as a string (called "chromosome") of finite length (say, L). Each string or chromosome is considered as an individual. A collection of M (finite) individuals is called a population. GAs start with a randomly generated population. In each iteration, a new population of same size is generated from the current population using three basic operations on the individuals of the population. The operators in the three basic operations are reproduction/selection, crossover, and mutation.

To use GAs in searching a global optimal solution, a first step is to define a mechanism to represent the solutions in a chromosomal form. A solution may be represented as a string of length L over a finite set of alphabet $A = \{\alpha_1, \alpha_2, \ldots, \alpha_m\}$. Each string S corresponds to a value $x \in D$ and is of the form $S = (\beta_L \beta_{L-1} \cdot \beta_2 \beta_1)$; $\beta_i \in A$, $\forall i$. The GA with $A = \{0,1\}$ is called binary coded genetic algorithm (BCGA) or simple genetic algorithm (SGA).

The string representation limits the GA to search a finite domain (although users can achieve approximation by increasing the string length) and provides the best solution among $m^L$ possible options. To take into account the continuous domain, real valued strings are considered as the chromosomal representation by manipulating the genetic operators and is called real coded genetic algorithm (RCGA). It is difficult, however, to consider all the real values considering the limitation of computers in storing irrational values. Throughout the present disclosure, GA with A={0,1} is used as an example only. The teachings of the present disclosure can be easily extended to GAs defined over a finite set of alphabet or over RCGAs.

Generally, a random sample of size M is drawn from a space S of $2^L$ possible strings to generate an initial population. GAs leverage a population of solutions to generate a new population with an expectation that the new population will provide a better solution in terms of fitness values.

In every iteration, each chromosome of the population is evaluated using a fitness function fit. Evaluation or fitness function fit for a string S is equivalent to a function $f$ defined below.

$$fit(S)=f(x),$$

where S corresponds to x. Without loss of generality, let fit(S)>0 for all S in S.

A selection is a process in which individual strings of a current population are copied into a mating pool with respect to an empirical probability distribution based on their fitness function values. In some cases, an auxiliary fitness value is considered to generate the empirical probability distribution based on the criticality of the problem and approach.

A crossover exchanges information between two potential strings and generates two offsprings for the next population. M/2 pairs are selected randomly from the population. Substrings with a probability p (called crossover probability) are swapped.

A mutation is an occasional random alteration of a character. Mutation introduces some extra variability into the population. Though mutation is usually performed with a very low mutation probability, q>0, mutation affects exploration process. Every character $\beta_i$, i=1, 2, . . . , L in each chromosome generated after crossover has an equal chance to undergo mutation. Any string can be generated from any given string by mutation operation. The mutation probability q is taken to be in the range of (0, 0.5]. The probability of mutating i bit positions is more than the probability of mutating i+1 bit positions. That is, $$q^i(1-q)^{L-i} > q^{i+1}(1-q)^{L-i-1} \forall i=0,1,2,\ldots,L-1$$

Thus, q≤0.5. Hence, the minimum probability of obtaining any string from any given string is $q^L$. That is, mutation needs to be performed at every character position of the given string.

Knowledge about the best string obtained so far is preserved either in a separate location outside the population or within the population. Thus, the GA can report the best value found among all possible coded solutions obtained during the entire process. GAs that can retain the knowledge of the best string obtained so far are called genetic algorithms with elitist model or EGAs.

The new population obtained after selection, crossover, and mutation is then used to generate another population. The number of possible populations is finite since M is finite. The present disclosure concerns EGAs, where the best string obtained in a previous iteration is copied into a current population if the fitness function values of all strings are less than the previous best.

The values for parameters L, M, p, and q have to be chosen properly before performing these operations. For example, the population size M is taken as an even integer so that strings can be paired for crossover. The probability (p) of performing crossover operation is taken to be any value between 0.0 and 1.0. Usually in GAs, p is assumed to be a value in the interval [0.25, 1]. The mutation probability q is taken to be very low [0.001, 0.01], although it can be in the interval (0, 0.5].

Mutation affects convergence of GAs to the global optimal solution. Convergence of GAs is a fundamental building block in proposing variance of the best fitness value obtained so far as the stopping criterion of a GA. A proof of convergence of GAs follows.

GAs search over a space S of $2^L$ strings and eventually provide the best solution with respect to the fitness function fit. The strings can be classified into a set of s classes depending on their fitness function values. The classes are defined as $$S_i = \{S : fit(S) = F_i\},$$

where $F_i$ denotes the i th highest fitness function value. Thus, $F_1 > F_2 > \ldots > F_s$. Without loss of generality, let $F_s > 0$.

A population Q is a multi-set of M strings of length L generated over a finite alphabet A and is defined as follows:

$$Q = \{S_1, S_1, \ldots, (r_1 \text{ times}), S_2, S_2, \ldots, (r_2 \text{ times}), \ldots, S_m, S_m, \ldots, (r_m \text{ times}) \text{ where}, S_i \in S; S_{i_1} \neq S_{i_2} \forall i_1 \neq i_2 \text{ and } r_i \geq 1 \text{ for } i=1, 2, \ldots, m; \Sigma_{i=1}^m = M\}.$$

Let Q denote the set of all populations of size M. The number of populations or states in a Markov chain is finite. The fitness function value fit(Q) of a population is defined as fit(Q)= $\max_{s \in Q} fit(S)$. The populations are partitioned into s sets. $E_i = \{Q : Q \in Q \text{ and } fit(Q) = F_i\}$ a set of populations having the same fitness function value $F_i$.

In an iteration, the genetic operators (selection, crossover, and mutation) create a population $Q_{kl} \in E_k$, where l=1, 2, . . . , $e_k$ and k=1, 2, . . . , s. The genetic operators create the population $Q_{kl}$ from a population $Q_{ij} \in E_i$, where $e_k$ is the number of elements in $E_k$. The generation of the population $Q_{kl}$ from the population $Q_{ij}$ is considered as a transition from $Q_{ij}$ to $Q_{kl}$. Let $p_{ij,kl}$ denote a transition probability of the transition from $Q_{ij}$ to $Q_{kl}$.

Then the probability of transition from $Q_{ij}$ to any population in $E_k$ can be calculated as $$p_{ij,k} = \sum_{l=1}^{e_k} p_{ij,kl}; j=1, 2, \ldots, e_i; k=1, 2, \ldots, s.$$

For all j=1.2, . . . , $e_i$ and i=1, 2, . . . ,s one obtains $$p_{ij,k} > 0 \quad \text{if } k \leq i$$
$$= 0 \quad \text{otherwise}$$

by construction. Thus, once GAs reach a population $Q \in E_k$, the GAs will be in a population $Q \in E_k$ for k≤i. In particular, once GAs reach a population $Q \in E_1$, the GAs will not go out of $E_1$.

Let $p_{ij,kl}^{(n)}$ denote a probability that GA results in $Q_{kl}$ at the nth step given that the initial state is $Q_{ij}$. Let $p_{ij,k}^{(n)}$ denote the probability of reaching one of the populations in $E_k$ from $Q_{ij}$ at the nth step. Then $p_{ij,k}^{(n)} = \Sigma_{l=1}^{e_k} p_{ij,kl}^{(n)}$.

To show the eventual convergence of a GA with elitist model to a global optimal solution the following theorem (Theorem 1) is proved.

Theorem 1.

For an *EGA* with the probability of mutation $q \in \left[0, \frac{1}{2}\right]$, (1)

$\lim_{n \to \infty} p_{ij,k}^{(n)} = 0$ for $2 \le k \le s$; $\forall\, j = 1, 2, \ldots, e_i$ and $i = 1, 2, \ldots, s$.

Hence $\lim_{n \to \infty} p_{ij,1}^{(n)} = 1 \forall\, j = 1, 2, \ldots, e_i$ and $i = 1, 2, \ldots, s$.

Proof: It can be easily shown that $p_{ij,1} > 0$
for $j = 1, 2, \ldots e_i$ and $i = 1, 2, \ldots, s$.

Let $\max_{i,j}(1 - p_{ij,1}) = \delta$.

Note that $\delta < 1$ since $\min_{i,j} p_{ij,1} > 0$.

Now, $\sum_{k \ne 1} p_{ij,k}^{(1)} = \sum_{k=2}^{s} p_{ij,k} = 1 - p_{ij,1} \le \delta;$ (2)

$$\sum_{k \ne 1} p_{ij,k}^{(2)} = \sum_{k=2}^{s} \sum_{i_1 \ne 1} \sum_{j_1=1}^{e_{i_1}} p_{ij,i_1 j_1} p_{i_1 j_1,k}$$ (3)

(since $p_{i_1 j_1,k} = 0$ for $k > 1$)

$$= \sum_{i_1 \ne 1} \sum_{j_1=1}^{e_{i_1}} p_{ij,i_1 j_1} \sum_{k=2}^{s} p_{i_1 j_1,k}$$

$$= \sum_{i_1 \ne 1} \sum_{j_1=1}^{e_{i_1}} p_{ij,i_1 j_1}(1 - p_{i_1 j_1,1})$$

$$\le \delta \sum_{i_1 \ne 1} \sum_{j_1=1}^{e_{i_1}} p_{ij,i_1 j_1} \text{ (from (1))}$$

$$= \sum_{i_1 \ne 1} p_{ij,i_1}$$

$$= \delta(1 - p_{ij,1}) \le \delta^2;$$

Similarly, by mathematical induction, it can be shown that
$\sum_{k \ne 1} p_{ij,k}^{(n)} \le \delta^n \forall\, i, j$.

Note that $\delta^n \to 0$ as $n \to \infty$ since $0 \le \delta < 1$.

Hence $\sum_{k \ne 1} p_{ij,k}^{(n)} \to 0$ as $n \to \infty$.

Which, immediately implies $\lim_{n \to \infty} p_{ij,k}^{(n)} = 0$ for $2 \le k \le s \forall\, i$ and $j$.

It is clear that, $\lim_{n \to \infty} p_{ij,1}^{(n)} = \lim_{n \to \infty} \left(1 - \sum_{k \ne 1} p_{ij,k}^{(n)}\right)$ $= 1.$ Some desirable properties of a good stopping criterion include the following. The stopping criterion should be easy to implement. The stopping criterion should be able to provide stopping time automatically for any fitness function. The stopping criterion should guarantee convergence and lead to a satisfactory result. The total number of strings searched should not exceed $2^L$, where L is string length.

In an embodiment of an example stopping criterion, let $a_i$, be a best fitness function value obtained at the end of an ith iteration of an EGA. Then, $a_1 \le a_2 \le a_3 \le F_1$ as $F_1$ is the global optimal value of the fitness function. Let $$a_n^- = \frac{1}{n} \sum_{i=1}^{n} a_i$$

be an average of the $a_i$'s up to the nth iteration. Then variance of the best fitness values obtained up to the nth iteration, defined by $b_n$, is given by the following equation:

$$b_n = \frac{1}{n} \sum_{i=1}^{n} (a_i - a_n^-)^2 = \frac{1}{n} \sum_{i=1}^{n} a_i^2 - a_n^{-2} = \overline{a_n^2} - a_n^{-2}$$

$b_n$ can be used as a stopping criterion for a GA. In this example embodiment, a GA is stopped or terminated after N iterations when $b_N \le \epsilon$, where $\epsilon$ ($>0$) is a user-defined small quantity (bound for variance).

Referring now to FIG. 1, an example method 50 comprising basic steps of a GA with elitist model is shown, where variance of the best solutions obtained in the generations is considered as a stopping criterion. Control begins at 52. At 54, control creates a population of random solutions, and control defines a value for $\epsilon$ (i.e., a bound for variance). At 56, control evaluates each solution on the basis of a fitness function. At 58, control stores the best solution if it is better than previous best. At 60, control calculates the variance of the best solutions obtained up to the current iteration. At 62, control determines whether the variance is greater than the predefined bound ($\epsilon$). At 64, if the variance is greater than the predefined bound ($\epsilon$), control creates new generation of solutions from the old generation using selection, crossover, and/or mutation, and control returns to step 56. At 66, if the variance is not greater than the predefined bound ($\epsilon$), control terminates the GA. The best solution obtained at the time of termination represents the near optimal solution.

In an example embodiment, when the number of generations tends to infinity, the probability of obtaining the global optimal solution tends to one, and the variance of the best solutions obtained in the generations approaches zero. Following is a proof that when the number of generations tends to infinity, the probability of obtaining the global optimal solution tends to one, and the variance of the best solutions obtained in the generations approaches zero.

For GAs with elitist model, the convergence theorem shows that $\lim_{n \to \infty} p_{ij,1}^{(n)} = 1 \forall\, j = 1, 2, , e_i$ and $i = 1, 2, , s$.

The convergence theorem in turn implies that the probability of obtaining a global optimal solution ($F_1$) is one as number of iterations, goes to infinity. This can be stated as the following lemma.

Lemma 1:

For each $\epsilon_1 > 0$, $\lim_{n \to \infty} Prob(|a_n - F_1| > \epsilon_1) = 0$. (4)

In other words, for each $\epsilon_0 > 0$ and $\epsilon_1 > 0$,
there exists $N_0$ such that for $n > N_0$.
$1 - Prob(|a_n - F_1| \le \epsilon_1) < \epsilon_0$ or
$\Rightarrow Prob(|a_n - F_1| \le \epsilon_1) > 1 - \epsilon_0$ for $n > N_0$ Using the above lemma, it can be shown (as shown in Theorem 2 below), that the variance of the best solutions obtained in the generations approaches zero when number of iterations tends to ∞.

Theorem 2:

$$Prob\left(\frac{1}{n}\sum_{i=1}^{n}(a_i - a_n^-)^2 \leq \epsilon\right) \to 1 \text{ as } n \to \infty \text{ for each } \epsilon > 0.$$

Proof:

$$\frac{1}{n}\sum_{i=1}^{n}(a_i - a_n^-)^2 = \frac{1}{n}\sum_{i=1}^{n}[(a_i - F) - (a_n^- - F_1)]^2 \quad (5)$$

$$= \frac{1}{n}\sum_{i=1}^{n}(a_{i-F_1})^2 - (a_n^- - F_1)^2$$

$$\leq \frac{1}{n}\sum_{i=1}^{n}(a_i - F_1)^2$$

Now for $n > N_0$, $$\frac{1}{n}\sum_{i=1}^{n}(a_i - F_1)^2 = \frac{1}{n}\sum_{i=1}^{N_0}(a_i - F_1)^2 + \frac{1}{n}\sum_{i=N_0+1}^{n}(a_i - F_1)^2$$

Since $F_s$ is the minimum value of the function $f(x)$ (defined in section 3), we have, $$\frac{1}{n}\sum_{i=1}^{N_0}(a_i - F_1)^2 \leq \frac{1}{n}\sum_{i=1}^{N_0}(F_s - F_1)^2 \text{ (as } F_s \leq a_i \leq F_1 \forall i) \quad (6)$$

$$= \frac{N_0}{n}(F_s - F_1)^2$$

One can always find an $N_1(>N_0)$ such that for each $\epsilon_2(>0)$, $$\frac{N_0}{N_1}(F_s - F_1)^2 < \epsilon_2 \quad (7)$$

Therefore, for $n > N_1 > N_0$ $$\frac{1}{n}\sum_{i=1}^{N_0}(a_i - F_1)^2 \leq \frac{N_0}{n}(F_s - F_1)^2 \leq \frac{N_0}{N_1}(F_s - F_1)^2 \leq \epsilon_2 \text{ from (7)} \quad (8)$$

As $a_1 \leq a_2 \leq a_3 \leq \ldots \leq a_i \leq a_{i+1} \leq \ldots \leq F_1$, $$\frac{1}{n}\sum_{i=N_0+1}^{n}(a_i - F_1)^2 \leq \frac{1}{n}\sum_{i=N_0+1}^{n}(a_{N_0+1} - F_1)^2 \quad (9)$$

$$= \frac{n - N_0 + 1}{n}(a_{N_0+1} - F_1)^2$$

$$\leq (a_{N_0+1} - F_1)^2$$

From (4), we have for $n > N_0$, $Prob(|a_n - F_1| \leq \epsilon_1) > 1 - \epsilon_0$ Therefore, $$Prob((a_{N_0+1} - F_1)^2 \leq \epsilon_1^2) > 1 - \epsilon_0 \quad (10)$$

$\Rightarrow Prob((a_{N_0+1} - F_1)^2 \leq \epsilon_1) > 1 - \epsilon_0, \text{ as } \epsilon_1 \ll 1.$ Now, for each $\epsilon = \epsilon_1 + \epsilon_2$, $$Prob\left(\frac{1}{n}\sum_{i=1}^{n}(a_i - F_1)^2 \leq \epsilon\right) = \quad (11)$$

$$Prob\left(\frac{1}{n}\sum_{i=1}^{N_0}(a_i - F_1)^2 + \frac{1}{n}\sum_{i=N_0+1}^{n}(a_i - F_1)^2 \leq \epsilon\right) \geq$$

$$Prob\left(\epsilon_2 + \frac{1}{n}\sum_{i=N_0+1}^{n}(a_i - F_1)^2 \leq \epsilon\right) \text{ (from 8)} =$$

$$Prob\left(\frac{1}{n}\sum_{i=N_0+1}^{n}(a_i - F_1)^2 \leq \epsilon - \epsilon_2\right) > 1 - \epsilon_0,$$

(from 10), where $\epsilon_1 = \epsilon - \epsilon_2$.

Therefore, we can conclude that for each.

$\epsilon_0 > 0$, there exists $N_1$ such that for $n > N_1$ $$Prob\left(\frac{1}{n}\sum_{i=1}^{n}(a_i - F_1)^2 < \epsilon\right) > 1 - \epsilon_0$$

In other words, $$Prob\left(\frac{1}{n}\sum_{i=1}^{n}(a_i - F_1)^2 \leq \epsilon\right) \to 1 \text{ as } n \to \infty \text{ for each } \epsilon > 0.$$

This completes the proof of theorem 2.

In an example embodiment of a variance based stopping algorithm, the user needs to select only the bound ϵ for variance for implementing the stopping criterion. In this embodiment, the likelihood of obtaining a solution closer to global optima is inversely proportional to the value of the bound ϵ. Additionally, in the initial iterations, the likelihood of obtaining the improved fitness value is high. Moreover, in this embodiment, for most functions, due to the low iteration number, the variance would initially increase and would then decrease as the iteration number increases. Accordingly, a premature termination of the GA can be avoided. Further, the inherent characteristics of the objective functions are automatically taken into account for a sufficiently small value of the bound for variance. Distinctively, the user need not define the number of iterations to be executed. Instead, the user defines the value of E.

Defining the value of ϵ differs from defining the number of iterations to be executed. In defining the number of iterations, the user decides the total number of iterations while hoping or assuming that the GA will provide a satisfactory result after those many iterations. Selecting the total number of iterations in this manner, however, is purely heuristic and ignores the characteristics of the objective function and genetic parameters. In contrast, in defining the value of ϵ, the variance is calculated from the fitness values obtained in the generations, which implicitly takes into account the characteristics of the objective function and the genetic parameters used in the GA.

Generally, a GA progresses fast during initial iterations. Accordingly, GAs are expected to produce improved results in the first few iterations. After a certain number of iterations, GAs typically become quite stable. Subsequently, the possibility of exploring an improved solution in each iteration is very low. Faster improvement of the fitness function values yields high variance in the beginning, and slower improvement in fitness function results in low variance in the later stages of the GA.

Due to these characteristics of GAs, selecting certain parameters is critical in the implementation of the variance as a stopping criterion. Specifically, selecting the starting iteration number of the GA, from which the best fitness values are to be considered in calculating the variance, and the minimum number of iterations to be considered in calculating the variance are important considerations in the implementation.

One can consider the fitness values from the first iteration in calculating the variance. However, due to the faster improvement in the initial generations, higher number of iterations may make the variance lower than the predefined E value. Accordingly, to avoid premature termination, it is important to determine the number of consecutive iterations that should be considered in calculating the variance of the fitness values so as to allow the GA enough opportunity to yield an improved solution. This is important since the GA may not find a better solution that shows improvement in fitness value in many consecutive iterations. Therefore, it is important to select the minimum number of iterations and a starting point (iteration) from which the fitness values will be considered in calculating the variance.

In an example embodiment, a variance $b_{n+}$ at the end of n+1th iteration can be calculated from $b_n$ as follows:

$$b_{n+1} = \frac{1}{n+1}\sum_{i=1}^{n+1}(a_i - a_{n+1}^-)^2 = \frac{1}{n+1}\sum_{i=1}^{n+1}a_i^2 - a_{n+1}^{-2} \quad (12)$$

or $$b_{n+1} = \frac{1}{n+1}((na_n^{-2} + a_{n+1}^2) - (na_n^- + a_{n+1})^2).$$

Thus, the variance for the n+1th generation can be evaluated based on only an average of the fitness function values and their square of the previous n iterations.

Example experimental results discussed below demonstrate the effectiveness of the proposed stopping criterion in searching for global optimal solutions of some complex functions of multiple variables. The variance of the best fitness values obtained in each iteration is used as the stopping criterion to demonstrate its usefulness to automatically terminate the GA. The following objective functions were used in the experiment.

$$f_1(x) = 6 + \sin(x) \text{ when } 0 \le x \le 2\pi$$
$$= 6 + 2\sin(x) \text{ when } 2\pi < x \le 4\pi$$
$$= 6 + 3\sin(x) \text{ when } 4\pi < x \le 6\pi$$
$$= 6 + 4\sin(x) \text{ when } 6\pi < x \le 8\pi$$
$$= 6 + 5\sin(x) \text{ when } 8\pi < x \le 10\pi$$
$$= 6 + \sin(x) \text{ when } 10\pi < x \le 32$$

$$f_2(x) = \log\left(1 + \sum_{i=1}^{5}|[x_i]| + \sum_{i=1}^{5}|x_i|\right),$$

when $[x]$ is the integral part of $x$ $$f_3(x) = \frac{1}{1 + \sum_{i=1}^{5}[x_i]^2}, \text{ where } [x] \text{ is the integral part of } x$$

$$f_4(x) = \frac{20}{11 + \sum_{i=1}^{5} -[x_i]*\sin(\sqrt{|[x_i]|})},$$

where $[x]$ is the largest integer $\le x$

Referring now to FIGS. 2-5, pictorial representations of these functions are shown. $f_1$ is a univariate function while the remaining functions are multivariate functions with the number of variables considered being five, for example. Functions $f_2$ and $f_3$ are multimodal functions with symmetrically distributed plateaus of identical size and having multiple global maxima. Functions $f_1$ and $f_4$ are unimodal functions with spatially distant local maxima and single global maxima. Different search spaces are considered for different functions to exploit the typical features of these functions.

In these experiments, while implementing the proposed stopping criterion, the initial iterations can be ignored as mentioned above. The number of these initial iterations can be decided based on the length of the strings and the population size. The convergence theorem holds true although the variance is calculated after a finite number of initial iterations. In the experiments, the fitness function values considered to calculate the variance were from the 21st iteration for $f_1$ and from the 101st iteration for other functions.

Additionally, as discussed above, there may be no change in the fitness function value for a number of consecutive iterations. In an example iteration, therefore, the variance could become zero and could result in premature termination of the GA. Accordingly, in an embodiment to avoid premature termination, the user should consider a significant number of iterations in calculating the variance. In the experiment, the minimum number of iterations considered to generate the variance was 50 for $f_1$ and 200 for other functions.

The genetic parameters used in the execution of the GA were as follows:
Population size=10 for $f1$ and 50 for others
String length=20 for $f1$ and 100 for others
Crossover probability=0.8
Mutation probability=varying from 0.2 to 0.45

To obtain statistically significant results, one test run comprised 100 runs for a particular $\epsilon$ value for each function. Different seeds were supplied to bring in the randomness in generating initial populations and performing other genetic operations. Considering the importance of mutation in the convergence process of the GAs, the mutation probability was made variable. It was considered as high as 0.45 in the initial iterations and was monotonically reduced to 0.1 towards final iterations.

Figure 6:
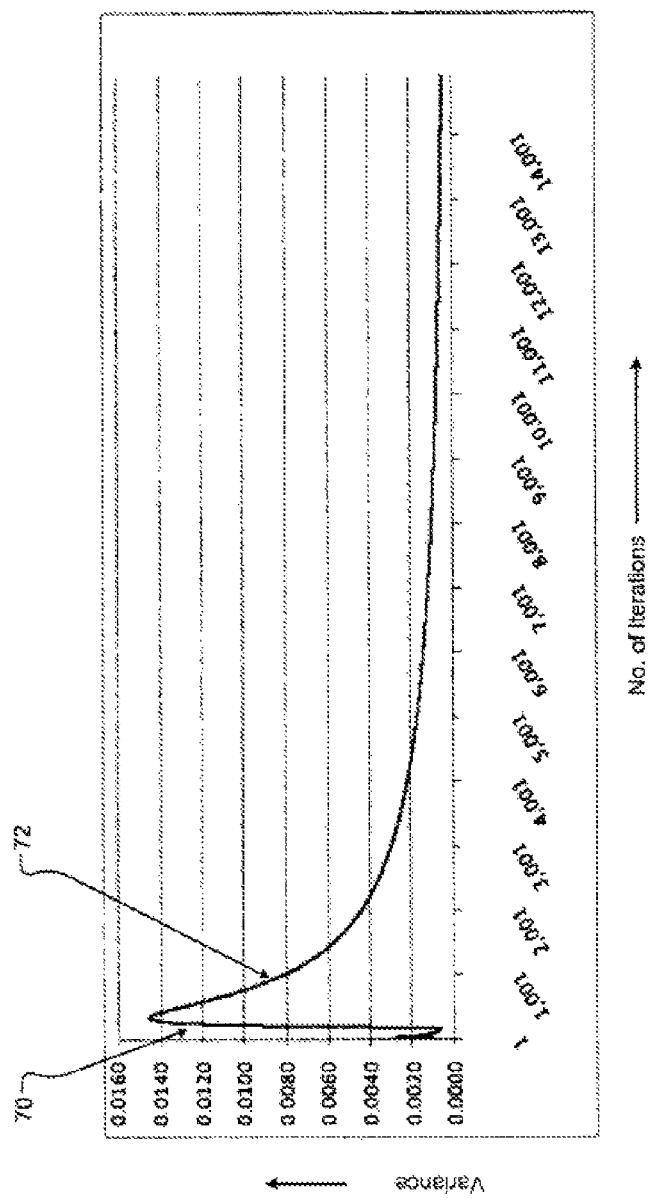
FIG. 6 is an example graph of variance of best fitness values obtained in iterations of a genetic algorithm (GA) relative to a number of iterations performed in the GA.

Referring now to FIG. 6, a graph of variance relative to iteration numbers is shown. In an example embodiment, as the GA explores a better solution with higher fitness value, the variance increases. As shown, the variance initially increased at 70 and then decreased at 72 as the number of iterations increased.

Referring now to FIG. 7, a Table shows average number of iterations required to converge the GA for a given $\epsilon$. The results show that for a low value of $\epsilon$, the GA produced satisfactory performance for all the functions. Particularly, the GA produced a global optimal solution in most cases for $\epsilon=10^{-5}$. The number of iterations to attain the given bound differed for different functions depending on the characteristics of the function. Also, the percentage of convergence to the global optimum solution was higher for the function $f_3$ while the percentage of convergence to the global optimum solution was lower for the function $f_4$. With $\epsilon>10^{-4}$, no run could produce the global optimal solution since the presence of multiple global optima of the function $f_3$, resulted in faster convergence while a single optimum of the function $f_4$ was difficult to attain. This demonstrated the effectiveness of the criterion to take into account the inherent properties of the objective function.

In some cases, though the stopping criterion was satisfied, the GA did not converge to the global optimal value of the objective function. This comports with the property of the GAs that GAs do not guarantee the global optimal solution in a finite number of iterations. However, with the reduction in $\epsilon$ value, the likelihood of obtaining the global optimal solution increased.

The variance of the best solutions obtained up to a current iteration tends to zero as n→∞. In practice, the user needs to select an appropriate value for the upper bound of the variance for a problem. Different problems with the same size of search space may need different bounds for variance to obtain global optimal solution. For better accuracy, the user needs to select sufficiently small value for $\epsilon$. Instead of automatically selecting the value of $\epsilon$, the user may select the value of $\epsilon$ depending on the accuracy desired.

Figure 8:
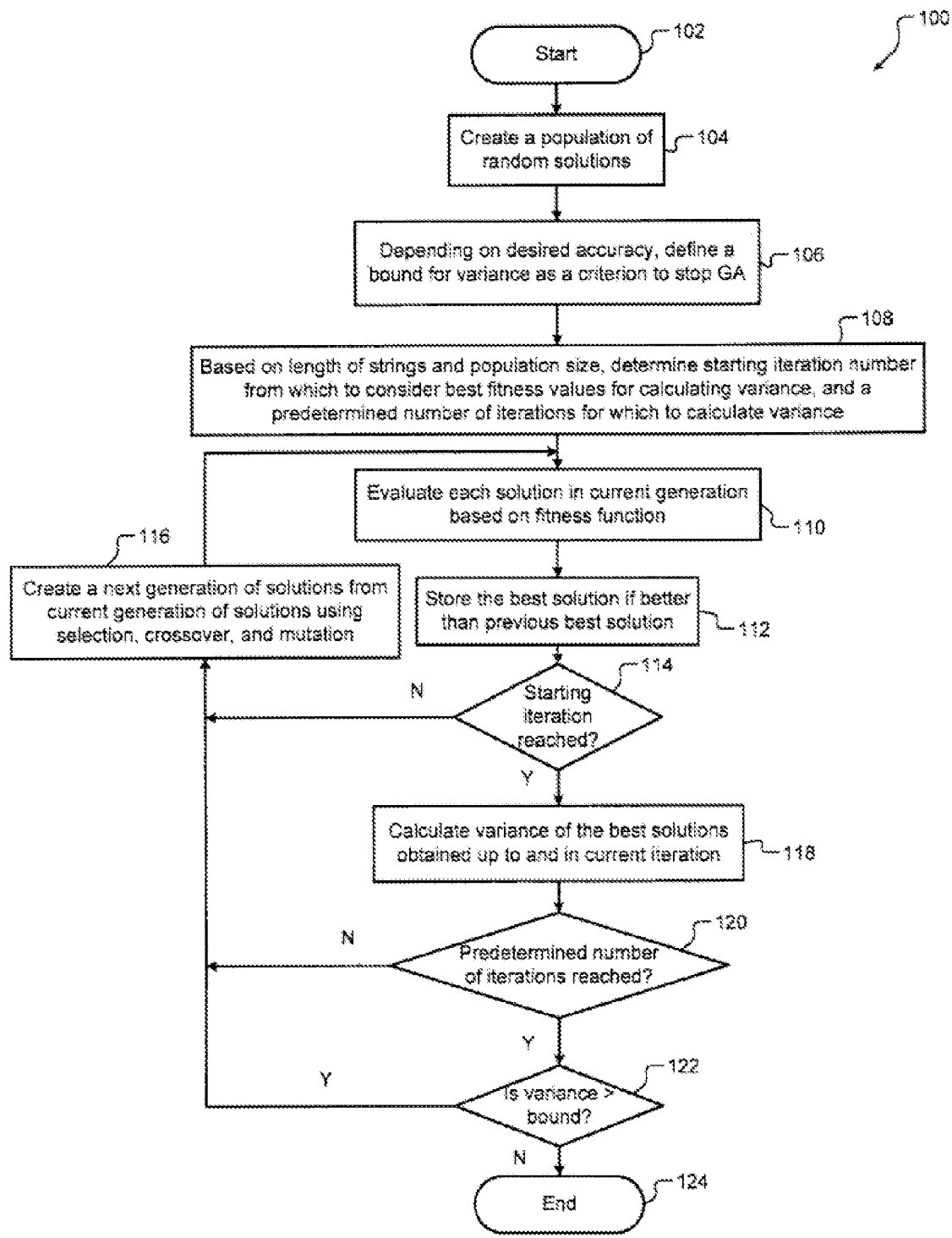
FIG. 8 is an example flowchart of a method for determining a stopping criterion and terminating a GA using the stopping criterion.

Referring now to FIG. 8, an example method 100 for determining a stopping criterion and terminating a GA using a stopping criterion is shown. Control begins at 102. At 104, control creates a population of random solutions. At 106, control defines a bound for variance as a criterion to terminate a GA. Control defines the bound depending on the desired accuracy of the GA. At 108, control determines a starting iteration number from which to consider solutions with best fitness values for calculating variance to determine whether to terminate the GA according to the stopping criterion. Control determines the starting iteration based on the length of strings and the size of the population. Additionally, control sets a predetermined (minimum) number of iterations for which variance calculation is to be performed.

At 110, control evaluates each solution in the current generation based on the fitness function. At 112, control stores the best solution if it is better than the previous best solution. At 114, control determines whether current iteration is the starting iteration. At 116, when current iteration is not the starting iteration, control creates a next generation of solutions from the current generation of solutions using selection, crossover, and mutation, and control returns to 110. At 118, when the current iteration is the starting iteration, control calculates a variance of the best solutions obtained up to and in the current iteration.

At 120, control determines whether variance is calculated for the predetermined number of iterations. If variance is not calculated for the predetermined number of iterations, control returns to 116. At 122, if variance is calculated for the predetermined number of iterations, control determines whether the variance is greater than the bound. If the variance is greater than the bound, control returns to 116. At 124, if the variance is not greater than the bound, control terminates the GA.

Figure 9:
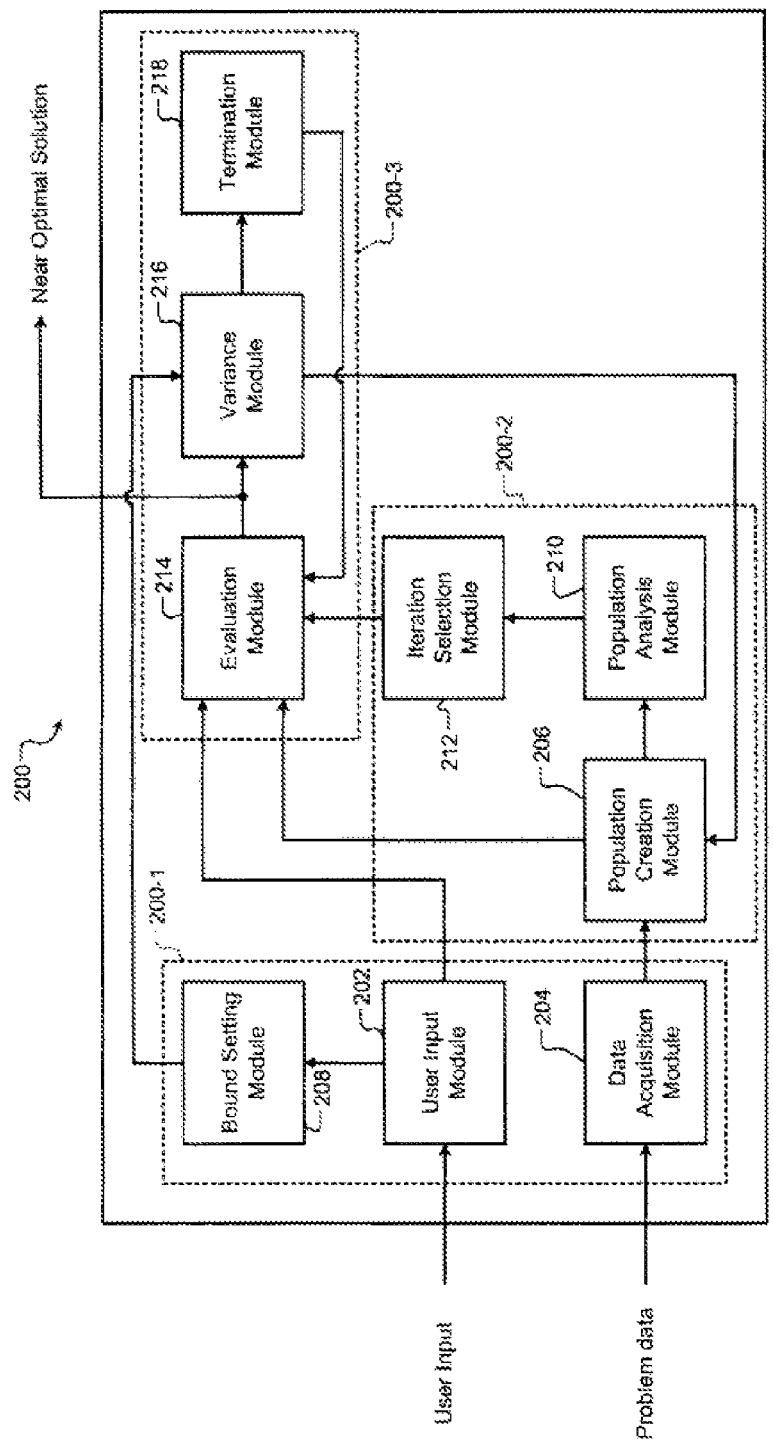
FIG. 9 is an example functional block diagram of a system for determining a stopping criterion and terminating a GA using the stopping criterion.

Referring now to FIG. 9, an example system 200 for determining a stopping criterion and terminating a GA using a stopping criterion is shown. The system 200 executes a GA to find the best solution for a problem. The problem may be related to any field including, but not limited to, operations research, very large scale integration (VLSI) circuit design, pattern recognition, image processing, machine learning, and so on.

The system 200 comprises a user input module 202, a data acquisition module 204, a population creation module 206, a bound setting module 208, a population analysis module 210, an iteration selection module 212, an evaluation module 214, a variance module 216, and a termination module 218. The system 200 may be implemented by software, hardware, firmware, or a combination thereof. The system 200 may also be implemented as a system-on-chip (SOC). For example, in FIG. 10, a computer 300 comprising one or more processors may implement portions of the system 200, wherein most components of the computer 300 may be implemented as a system-on-chip (SOC).

The system 200 comprises a data input unit 200-1, a data processing unit 200-2, and an evaluation and termination unit 200-3. The data input unit 200-1 comprises the user input module 202, the data acquisition module 204, and the bound setting module 208. The data input unit 200-1 receives input data for a problem to be solved. The data processing unit 200-2 comprises the population creation module 206, the population analysis module 210, and the iteration selection module 212. The data processing unit 200-2 processes the input data. The evaluation and termination unit 200-3 comprises the evaluation module 214, the variance module 216, and the termination module 218. The evaluation and termination unit 200-3 evaluates the processed data and terminates the GA.

The user input module 202 allows a user to input data. The user input module 202 receives the data from the user and outputs the data to the evaluation module 214. The data may include the accuracy desired by the user for the solution to be generated by the GA. The desired accuracy may depend on the type of data acquired by the data acquisition module 204. For example, the desired accuracy may depend on the type of problem being solved. In some implementations, the user may be remote relative to the system 200 and may access the system 200 via a wireline network or a wireless network. Accordingly, the user input module 202 may include a suitable network interface to connect the system 200 to a network.

The data acquisition module 204 acquires data for the problem to be solved. In some implementations, the data acquisition module 204 may comprise suitable instruments, transducers, etc. for acquiring data that is generated by processes and that is to be analyzed to find the solution. For example, the data acquisition module 204 may comprise pressure, temperature, and/or other sensors that sense parameters related to a chemical process. The data acquisition module 204 may comprise current, voltage, and/or other sensors that sense parameters related to an electrical system. The data acquisition module 204 may comprise an interface that acquires data generated by a computer aided design (CAD) system for integrated circuit (IC) layout design, vehicle design, and so on. The data acquisition module 204 outputs the acquired data to the population creation module 206.

The population creation module 206 creates a population of random solutions based on the data acquired by the data acquisition module 204. The population creation module 206 outputs the population to the population analysis module 210 and to the evaluation module 214.

The bound setting module 208 sets a bound for variance based on the accuracy desired by the user. In some implementations, the user may directly input and set the bound via the user input module 202. The bound for the variance is the stopping criterion for stopping the GA executed by the system 200. The bound setting module 208 outputs the bound to the variance module 216.

The population analysis module 210 analyses the population received from the population creation module 206 and outputs information such as length of strings and size of the population to the iteration selection module 212. The iteration selection module 212 selects the starting iteration number from which to consider best fitness values for calculating variance. The iteration selection module 212 selects the starting iteration number based on the length of strings and size of the population received from the population analysis module 210. Additionally, the iteration selection module 212 selects a predetermined (minimum) number of iterations for which variance calculation is to be performed. In some implementations, the user may input the starting iteration number and the minimum number of iterations via the user input module 202, and the iteration selection module 212 may receive the starting iteration number and the minimum number of iterations from the user input module 202.

The evaluation module 214 receives the population generated by the population creation module 206 and the desired accuracy input by the user via the user input module 202. The evaluation module 214 evaluates each solution in the current generation based on a fitness function. The evaluation module 214 calculates fitness values of the solutions using the fitness function and determines the best solution based on the fitness values. The evaluation module 214 stores the best solution if it is better than the previous best solution. In some implementations, the user may input the fitness function via the user input module 202. Alternatively, the user may input information related to the fitness function via the user input module 202, and the evaluation module 214 may generate the fitness function based on the information input by the user. Until the starting iteration is reached, the population creation module 206 creates a next generation of solutions from the current generation of solutions using selection, crossover, and mutation, and the evaluation module 214 repeats its operations.

The variance module 216 receives the best solutions stored in the evaluation module 214 and the bound for the variance from the bound setting module 208. When the starting iteration is reached, the variance module 216 begins calculating a variance of the best solutions obtained up to and in the current iteration. The population creation module 206, the evaluation module 214, and the variance module 216 continue their respective operations until the predetermined number of iterations are reached. After the predetermined number of iterations, the variance module 216 determines whether the variance is greater than the bound. So long as the variance is greater than the bound, the population creation module 206, the evaluation module 214, and the variance module 216 continue their respective operations.

The termination module 218 receives the variance calculated by the variance module 216. The termination module 218 compares the variance to the bound for the variance. The termination module 218 terminates the GA when the variance is less than or equal to the bound. The termination module 218 outputs a signal to the evaluation module 214 to terminate further evaluation. Additionally, the signal may terminate operation of the population creation module 210. The best solution stored in the evaluation module 214 at the time of termination is the near optimal solution for the problem.

Genetic algorithms can be applied to solve many real life complex optimization problems. For example, some of the applications in various areas include networking, scheduling, complex engineering, finance, image processing, pattern recognition, and learning. In networking, applications can be found in control of gas pipeline in steady and transient states. Applications can also be found in design of corporate communication networks that link various widely separated sites. In scheduling, applications can be found in solving complex scheduling problems such as examination time tabling. Further, applications can be found in solving complex job and open shop scheduling problems.

In complex engineering, GAs can be applied in solving channel routing problem in VLSI design, for example. In finance, applications can be found in portfolio optimization with an Envelope-based Multi-objective Evolutionary Algorithm. Further, applications can be found in development of several financial tools in trading, market prediction, etc. In image processing, applications can be found in generating image enhancements. In pattern recognition, applications can be found in feature selection and generation of class boundaries. In learning, applications can be found in computation and selection of optimal set of weights for neural networks.

Additionally, there are many other areas where GAs can be applied in solving complex problems. These areas include controller synthesis, test data generation in automatic testing of software, resource allocation systems, constrained service provisioning, data mining, molecular biology, web mining, production scheduling, imagery exploration, construction, transportation, telecommunication, manufacturing, retail, and so on.

In each of these applications, a population of solutions for the problem concerned is generated. Depending on the desired accuracy, a bound for variance is selected. In each iteration of the GA, the solutions are evaluated, and a best solution is detected. Beginning from a selected starting iteration, a variance of best solutions obtained in the iterations is calculated. Variance is calculated for a predetermined number of iterations. Thereafter, the GA is terminated when the variance is less than or equal to the bound. The solution obtained at the termination is the near optimal solution for the problem.

Although the stopping criterion disclosed herein is described to provide an optimal solution for a GA, the GA is used throughout the present disclosure as an example only. The stopping criterion disclosed herein can be used with other optimization techniques including other evolutionary algorithms. Additionally, stopping criterion disclosed herein can be used with other optimization techniques such as simulated annealing, particle swarm optimization, ant colony optimization, invasive weed optimization, harmony search, tabu search, Gaussian adaptation, and so on.

In addition to the GA, there are many other optimization techniques, such as those mentioned above, that are iterative in nature and that are guided by a criterion function. In an iterative optimization technique, a criterion function derived from the function to be optimized (e.g., fitness function for genetic algorithms, error/cost function for artificial neural network) is defined using the results of each iteration. In such cases, one of ordinary skill in the art can use the variance based stopping criterion disclosed herein in considering an appropriate bound (epsilon) for the variance of the criterion function values. Thus, the stopping criterion disclosed herein may be applicable for all iteration based algorithms.

Further, these other optimization techniques may be applied to solve problems in the areas described above and may have applications in addition to those discussed with respect to GAs. In each of these applications, a population of solutions for the problem concerned may be generated. Depending on the desired accuracy, a bound for variance may be selected. In each iteration of these optimization techniques, the solutions may be evaluated, and a best solution may be detected. Beginning from a selected starting iteration, a variance of best solutions obtained in the iterations may be calculated. Variance may be calculated for a predetermined number of iterations. Thereafter, these optimization techniques may be terminated when the variance is less than or equal to the bound as discussed herein with respect to GAs. The solution obtained at the termination may be the near optimal solution for the problem.

Figure 10:
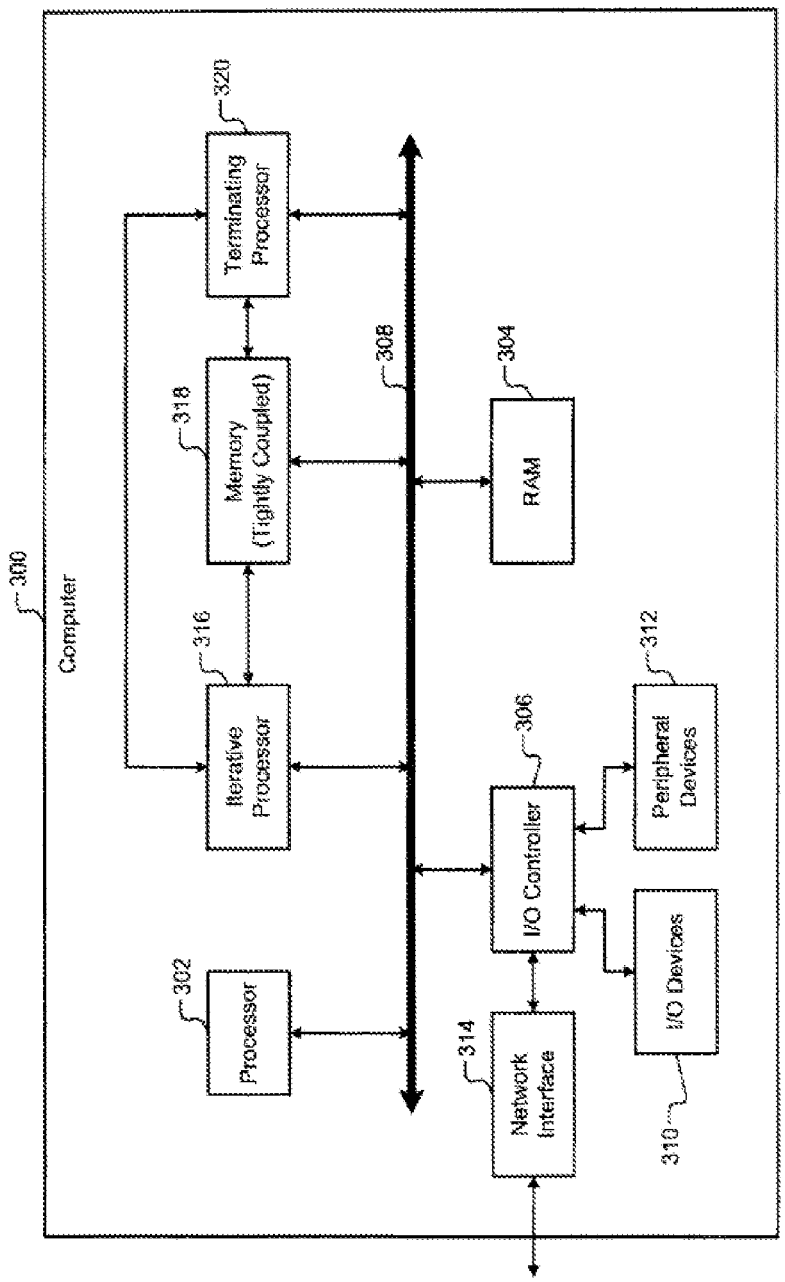
FIG. 10 is an example functional block diagram of a computer system for determining a stopping criterion and terminating a GA using the stopping criterion.

Referring now to FIG. 10, a computer 300 comprises a processor 302, memory 304, and an input/output (I/O) controller 306 that communicate via a system bus 308. The memory 304 may include random access memory (RAM). The I/O controller 306 controls I/O devices 310, peripheral devices 312, and a network interface 314. The I/O devices 310 may include a keyboard, a mouse, a display, and so on, which allow a user to interact with the computer 300. The display may include a touch-screen, which allows the user to enter inputs by touching fields shown on the display. The peripheral devices 312 may include mass storage devices such as disk drives, and so on, which are used to store an operating system (OS), applications, and data. The network interface 314 interfaces the computer 300 to a network (e.g., the Internet). The network interface 314 may be a wireline network interface or a wireless network interface and allows the user to remotely access the computer 300 via the Internet, for example. The processor 302 executes the OS and the applications and processes data. The processor 302 may use the memory 304 for temporary storage (e.g., as a scratch pad) and one or more of the peripheral devices 312 for permanently storing the data.

Additionally, the computer 300 comprises an iterative processor 316 and memory 318. The iterative processor 316 is shown separate from the processor 302 to illustrate the teachings of the present disclosure. In some implementations, the processor 302 may implement the iterative processor 316. For example, the processor 302 may comprise more than one core, where a first core may perform the functions of the processor 302 while a second core may perform the functions of the iterative processor 316. When the processor 302 implements the iterative processor 316, the processor 302 may be programmed to execute the functions performed by the iterative processor 316.

The iterative processor 316 communicates with the system bus 308. The iterative processor 316 executes iterative applications such as a GA and performs iterative operations such as those involved in the GA, for example. The memory 318 may be tightly coupled memory (TCM), where TCM is a low latency memory that is directly coupled to a processor such as the iterative processor 316 via a dedicated bus that is that is separate and apart from the system bus 308.

Although not shown, the iterative processor 316 may include multiple parallel processors. Alternatively, the iterative processor 316 may operate in parallel with other processors, where the iterative processor 316 performs some of the iterative operations, and the other processors perform the rest of the iterative operations. For example, the iterative processor 316 may operate in parallel with a terminating processor 320, where the terminating processor 320 terminates the GA using the variance based stopping criterion described herein.

The terminating processor 320 is shown separate from the processor 302 and the iterative processor 316 to illustrate the teachings of the present disclosure. In some implementations, the processor 302 and/or the iterative processor 316 may implement the terminating processor 320. For example, the processor 302 and/or the iterative processor 316 may comprise more than one core, where a first core may perform the functions of the processor 302 and/or the iterative processor 316 while a second core may perform the functions of the terminating processor 320. When the processor 302 and/or the iterative processor 316 implements the terminating processor 320, the processor 302 and/or the iterative processor 316 may be programmed to execute the functions performed by the terminating processor 320.

The terminating processor 320 may communicate with the iterative processor 316 and the system bus 308 and the memory 318: The terminating processor 320 may directly communicate with the iterative processor 316. Alternatively or additionally, the iterative processor 316, the memory 318, and the terminating processor 320 may communicate via the dedicated bus.

In some embodiments, the iterative processor 316 may be a very large-scale integrated circuit (VLSI). The VLSI may be customized to perform iterative operations such as those involved in a GA. For example, the VLSI may comprise a portion of the system 200 shown in FIG. 9. In other implementations, the processor 302 may also be integrated in the VLSI.

In some implementations, the GA may be executed over a distributed network of computers including the computer 300. In these implementations, the iterative processor 316 may operate in tandem with other processors on the distributed network. The iterative processor 316 may perform only some of the operations related to the GA while the other processor may perform other operations related to the GA. The user may remotely access the computer 300 and may remotely terminate the GA via the computer 300.

The iterative processor 316 may use the memory 304 for processing data in each of the iterations of the GA. For example, the memory 304 may be partitioned into two portions, where one portion is reserved for storing data processed by the iterative processor 316 while the other portion is used by the processor 302. Additionally or alternatively, the iterative processor 316 may utilize a memory 318 separate and apart from the memory 304. The memory 318 may be tightly coupled to the iterative processor 316 via a bus that is separate and apart from the system bus 308.

The memory 318 may be used to store instructions executed by the iterative processor 316. The instructions may include customized instructions for performing operations relative to the GA. For example, the instructions may include customized instructions for performing iterative operations relative to the GA. Additionally, the memory 318 may be used to cache best solutions generated in the iterations when the best solutions are better than those obtained in the previous iterations. Thus, the iterative processor 316 can perform the operations relative to the GA (e.g., variance calculation) quickly and independently of other operations being performed by the computer 300.

In use, the computer 300 may receive data and other inputs for a problem to be solved via the network interface 314 and/or via one or more of the peripheral devices 312. The data and the other inputs may be stored in data structures in memory 304 and/or memory 318. The iterative processor 316 processes the data and the other inputs according to the instructions stored in the memory 318. During processing, the iterative processor 316 performs read/write operations on the data structures. For example, the iterative processor 316 performs operations described in steps 52 through 66 of the method 50 shown in FIG. 1. More particularly, the iterative processor 316 performs operations described in steps 102 through 124 of the method 100 shown in FIG. 8 and operations of system 200 shown in FIG. 9. The iterative processor 316 generates a near optimal solution for the problem using the variance as a stopping criterion as described above.

Figure 11:
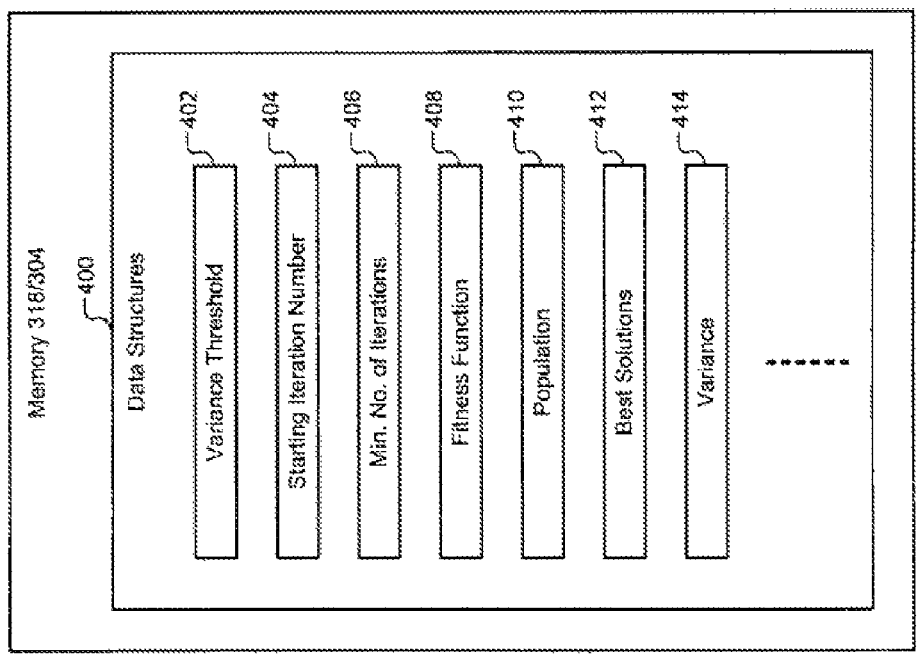
FIG. 11 is an example table showing data structures utilized by the computer system of FIG. 10.

Referring now to FIG. 11, an example of data structures 400 processed by the iterative processor 316 is shown. For example only, the data structures 400 may comprise the following data structures: variance threshold 402, starting iteration number 404, minimum number of iterations 406, fitness function 408, population 410, best solutions 412, and variance 414 data structures. Based on the data and the other inputs received by the computer 300, the data structures 400 may be utilized as follows.

The variance threshold 402 data structure stores a variance threshold (i.e., the bound for variance ($\epsilon$) that the iterative processor 316 uses as a stopping criterion to stop the GA. The starting iteration number 404 data structure stores a starting iteration number from which the iterative processor 316 begins variance calculation. The minimum number of iterations 406 data structure stores the minimum number of iterations to be performed after which the iterative processor 316 calculates the variance. The fitness function 408 data structure stores a fitness function that the iterative processor 316 uses to evaluate solutions and to determine the best solution in each iteration of the GA.

The population 410 data structure stores the solutions generated by the iterative processor 316 in each iteration of the GA. The best solutions 412 data structure stores the best solutions obtained in the iterations of the GA. For example, the iterative processor 316 stores a best solution obtained in a current iteration in the best solutions 412 data structure if the best solution obtained in the current iteration is better than a best solution obtained in a previous iteration.

The variance 414 data structure stores a variance of the best solutions obtained up to and in a current iteration of the GA. In each iteration, the iterative processor 316 calculates the variance of the best solutions stored in the best solutions 412 data structure and stores the variance in the variance 414 data structure. The iterative processor 316 may calculate the variance only in those iterations that follow the starting iteration number.

For example only, the variance threshold 402, starting iteration number 404, and minimum number of iterations 406 data structures may each comprise a single byte or a single word. Alternatively, the variance threshold 402, starting iteration number 404, and minimum number of iterations 406 data structures may together comprise a single byte or a single word. The population 410, best solutions 412, and variance 414 data structures may comprise a plurality of bytes, words, and/or blocks of memory. Accordingly, some of the data structures 400 may be stored in memory 304 while others may be stored in memory 318.

Additionally, although not shown, the iterative processor 316 may use other data structures during processing. For example, these additional data structures may be used to store iterative values (e.g., temporary values generated during iterations) and may includes data structures such as arrays, which may store best solutions, for example. Some of these additional data structures may be stored in memory 304 while others may be stored in memory 318.

In use, in an iteration, the iterative processor 316 reads solutions stored in the population 410 data structure and the fitness function stored in the fitness function 408 data structure. Using the fitness function, the iterative processor 316 determines the best solution in the current iteration. The iterative processor 316 outputs the best solution to the best solutions 412 data structure if the best solution in the current iteration is better than the best solution in a previous iteration.

The iterative processor 316 reads the starting iteration number from the starting iteration number 404 data structure and determines if the current iteration is greater than or equal to the current iteration. If the current iteration is greater than or equal to the current iteration, the iterative processor 316 reads the best solutions stored in the best solutions 412 data structure. The iterative processor 316 calculates variance of the best solutions and outputs the variance to the variance 414 data structure.

The iterative processor 316 reads the minimum number of iterations 406 data structure and determines if the variance is calculated for the minimum number of iterations following the starting iteration. If the variance is calculated for the minimum number of iterations following the starting iteration, the iterative processor 316 compares the variance in the current iteration. For example, if an $N^{th}$ iteration is the starting iteration number and if M is the minimum number of iterations, the iterative processor 316 compares the variance calculated in $(N+M)^{th}$ iteration, where N and M are integers greater than 1.

The iterative processor 316 (or the terminating processor 320) reads the variance threshold 402 data structure and compares the variance calculated in the $(N+M)^{th}$ iteration to the variance threshold. The iterative processor 316 (or the terminating processor) terminates the GA is the variance calculated in the (N+M)th iteration is less than or equal to the variance threshold.

In processing the data structures 400, the iterative processor 316 may execute the following pseudo code:

```
{
Begin
        SET Variance = 1
        GET Variance_Threshold
        GET Fitness_Function
        GET Population
        GET Starting_Iteration_Number
        GET Minimum_Number_Of_Iterations
        INIT Array Best_Solutions [ ]
        SET Total_Iterations = 0
        SET I = 0
        SET Solution = False
REPEAT  Current_Population = Population
        Current_Best_Solution =
        Fitness_Function(Current_Population)
        IF   (I=0  OR  Current_Best_Solution(I)  better  than
Current_Best_Solution (I-1))
        Best_Solutions [I] = Current_Best_Solution
        ENDIF
        IF I > Starting_Iteration_Number
        Variance = Current_Variance(Best_Solutions [I])
        INCREMENT Total_Iterations
        ENDIF
        IF (Total_Iterations > Minimum_Number_Of_Iterations)
AND (Variance ≤ Variance_Threshold)
        OUTPUT Best_Solutions
// The best solution of the last iteration is the near optimal solution. //
        Solution = True
        ENDIF
        Population = f(Current_Population)
// f is a function based on selection, crossover, and mutation. //
        INCREMENT I
UNTIL   Solution = True
END
}
```

In an embodiment, the variance threshold (i.e., the bound for variance (C)) and the starting iteration number may be statistically determined depending on the type of problem being solved and the distribution of the related data set as follows. For example, using samples from the data set, a variance curve may be generated to represent variation of variance relative to number of iterations. To solve the problem, the value of the variance threshold may be statistically determined based on a rate of change of variance where the slope of the variance curve is negative. Additionally, the value of the starting iteration number may be statistically determined such that the slope of the variance curve is positive and is near maximum. Further, the minimum number of iterations may be statistically determined based on the rate of change of variance where the slope of the variance curve is negative.

In an embodiment, a tangible computer-readable storage device may store program instructions that cause a processor to perform operations described with references to FIG. 1 and FIGS. 8-11 when the processor executes the program instructions. For example only, the tangible computer-readable storage device may include, but is not limited to, one or more of the following or similar devices: a memory integrated circuit, a solid-state disk, a hard disk drive, a compact disc (CD), and so on.

The memory may include, but is not limited to, random access memory (RAM), read-only memory (ROM), flash memory, volatile and/or non-volatile memory, re-writable memory, and so on.

The art relating to the present disclosure has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed.

For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present.

For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

Furthermore, in those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as A1, A2, and C together, A, B1, B2, C1, and C2 together, or B1 and B2 together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, the various aspects and embodiments are for purposes of illustration and are not intended to be limiting, with the true scope and spirit being indicated by the following claims.

The invention claimed is:

1. A system for terminating a genetic algorithm (GA) comprising: an iterator that executes a GA that generates at least one best solution per iteration;
a memory that stores a plurality of best solutions generated in a plurality of iterations of the GA, wherein a best solution is stored in the memory if a fitness function of the best solution is greater than a fitness function of a previous best solution generated in a previous iteration;
an iterative processor that computes a variance of the plurality of the best solutions stored in the memory; and a terminating processor that terminates the iterator when the variance is less than or equal to a predetermined threshold,
   wherein the terminating processor determines whether the variance is less than or equal to the predetermined threshold after a predetermined number of iterations are completed following a starting iteration, and
   wherein the predetermined number of iterations is statistically determined based on a rate of change of the variance when the rate of change of the variance relative to a number of the iterations is negative.

2. The system of claim 1, wherein the iterative processor computes the variance when a starting iteration is reached.

3. The system of claim 1, wherein the predetermined threshold is statistically determined based on a rate of change of the variance when the rate of change of the variance relative to a number of the iterations is negative.

4. The system of claim 2, wherein the starting iteration is statistically determined based on a rate of change of the variance when the rate of change of the variance relative to a number of the iterations is positive.

5. The system of claim 1, wherein the iterative processor generates the at least one best solution per iteration from a population of solutions using the fitness function, wherein each solution in the population is coded as a string of a finite length, and wherein a starting iteration is statistically determined based on the finite length and a size of the population.

6. The system of claim 5, wherein when the variance is greater than the predetermined threshold, the iterative processor generates a subsequent population of solutions from the population of solutions using operators including selection, crossover, and mutation.

7. The system of claim 1, wherein the predetermined threshold is selected based on a desired accuracy of the GA.

8. The system of claim 1, wherein the predetermined threshold takes into account properties of an objective function and genetic parameters used in the GA.

9. A method for terminating a genetic algorithm (GA), comprising:
   executing a GA by an iterator to generate at least one best solution per iteration;
   storing a plurality of best solutions generated in a plurality of iterations of the GA, wherein the best solution is stored in a memory if a fitness function of the best solution is greater than a fitness function of a previous best solution generated in a previous iteration;
   computing a variance of the plurality of best solutions stored in the memory using an iterative processor;
   terminating the iterator using a terminating processor when the variance is less than or equal to a predetermined threshold;
   determining whether the variance is less than or equal to the predetermined threshold after a redetermined number of iterations are completed when a starting iteration is reached; and
   determining statistically the predetermined number of iterations based on a rate of change of the variance when the rate of change of the variance relative to a number of iterations is negative.

10. The method of claim 9, further comprising computing the variance when a starting iteration is reached.

11. The method of claim 9, further comprising determining statistically the predetermined threshold based on a rate of change of the variance when the rate of change of the variance relative to a number of the iterations is negative, wherein the predetermined threshold takes into account properties of an objective function and genetic parameters used in the GA.

12. The method of claim 10, further comprising determining statistically the starting iteration based on a rate of change of the variance when the rate of change of the variance relative to a number of iterations is positive.

13. The method of claim 9, further comprising generating the at least one best solution per iteration from a population of solutions using the fitness function, wherein each solution in the population is coded as a string of a finite length, and wherein the starting iteration is determined statistically based on the finite length and a size of the population.

14. The method of claim 13, further comprising generating a subsequent population of solutions from the population of solutions using operators including selection, crossover, and mutation when the variance is greater than the predetermined threshold.

15. The method of claim 9, further comprising selecting the predetermined threshold based on a desired accuracy of the GA.

16. A tangible computer-readable storage device for storing program instructions that cause a processor to perform steps of the method of claim 9 when the processor executes the program instructions.

* * * * *

UNITED STATES PATENT AND TRADEMARK OFFICE
CERTIFICATE OF CORRECTION

PATENT NO. : 8,700,548 B2
APPLICATION NO. : 13/265480
DATED : April 15, 2014
INVENTOR(S) : Bhandari et al.

It is certified that error appears in the above-identified patent and that said Letters Patent is hereby corrected as shown below:

In the Specification

Column 6, Line 17, delete "$F_1$" and insert -- $F_i$ --, therefor.

Column 7, Line 64, delete "$a_i$," and insert -- $a_i$ --, therefor.

Column 7, Line 66, delete "$a_1 \leq a_2 \leq a_3 \leq F_1$" and insert -- $a_1 \leq a_2 \leq a_3 \leq \ldots \leq F_1$, --, therefor.

Column 10, Line 42, delete "of E." and insert -- of $\epsilon$. --, therefor.

Column 11, Line 6, delete "predefined E" and insert -- predefined $\epsilon$ --, therefor.

Column 11, Line 17, delete "$b_{n+}$," and insert -- $b_{n+1}$ --, therefor.

Column 11, Lines 49-51, delete "$\log\left(1 + \sum_{i=1}^{5} |[x_i]| + \sum_{i=1}^{5} |x_i|\right),$" and insert -- $\log\left(1 + \sum_{i=1}^{5} |[x_i]| + \prod_{i=1}^{6} |x_i|\right),$ --, therefor.

Column 17, Line 59, delete "318:" and insert -- 318. --, therefor.

Column 18, Line 61, delete "variance ($\epsilon$)" and insert -- variance ($\epsilon$)) --, therefor.

Column 20, Line 6, delete "(N+M)th" and insert -- $(N+M)^{th}$ --, therefor.

Column 21, Lines 1-4, delete "The memory..........so on." and insert the same in Column 20, at Line 67, after "so on", as a continuation paragraph.

Signed and Sealed this
Thirtieth Day of December, 2014

Michelle K. Lee
*Deputy Director of the United States Patent and Trademark Office*

CERTIFICATE OF CORRECTION (continued)
U.S. Pat. No. 8,700,548 B2

In the Claims

Column 24, Line 7, in Claim 9, delete "redetermined" and insert -- predetermined --, therefor.